April 20, 1937.  W. J. PEARMAIN  2,077,709
CLUTCH
Filed Feb. 19, 1936  2 Sheets-Sheet 1

Inventor:
William J. Pearmain
Davis, Audrey, Smith & Shunts
Attys.

April 20, 1937.  W. J. PEARMAIN  2,077,709

CLUTCH

Filed Feb. 19, 1936  2 Sheets-Sheet 2

Inventor:
William J. Pearmain
by Davis, Lindsey, Smith & Shonts
Attys.

Patented Apr. 20, 1937

2,077,709

UNITED STATES PATENT OFFICE 2,077,709

CLUTCH

William J. Pearmain, Racine, Wis., assignor to Twin Disc Clutch Company, Racine, Wis., a corporation of Wisconsin Application February 19, 1936, Serial No. 64,615

4 Claims. (Cl. 192—68)

My invention relates to clutches and more particularly to that type in which the driving position of the device is established by a mechanical or positive actuation of the component elements in contrast to spring loading.

One object of my invention is to devise a clutch of the plate type which is mechanically engaged by operating mechanism that tends to release under the impulse of centrifugal force, thus insuring that the clutch will run free in the disengaged position.

A further object is to provide a clutch of the character indicated in which the safety factor is raised by substantially housing the clutch levers in the principal members of the clutch, while retaining their complete accessibility and also that of the friction facings for replacement, and in which the throw of the levers remains constant.

Another object is to provide a clutch characterized by compactness, manufacturing simplicity, a high degree of efficiency, a capacity for ready adaptation to a wide variety of operating environments, freedom from rattle notwithstanding that the driving plate is composed of a plurality of segments, and which permits the use of relatively large diameter shafts without unduly increasing the outside diameter of the clutch.

These and further objects of my invention will be set forth in the following specification, reference being had to the accompanying drawings, and the novel means by which said objects are effectuated will be definitely pointed out in the claims. In the drawings:

Figure 1:
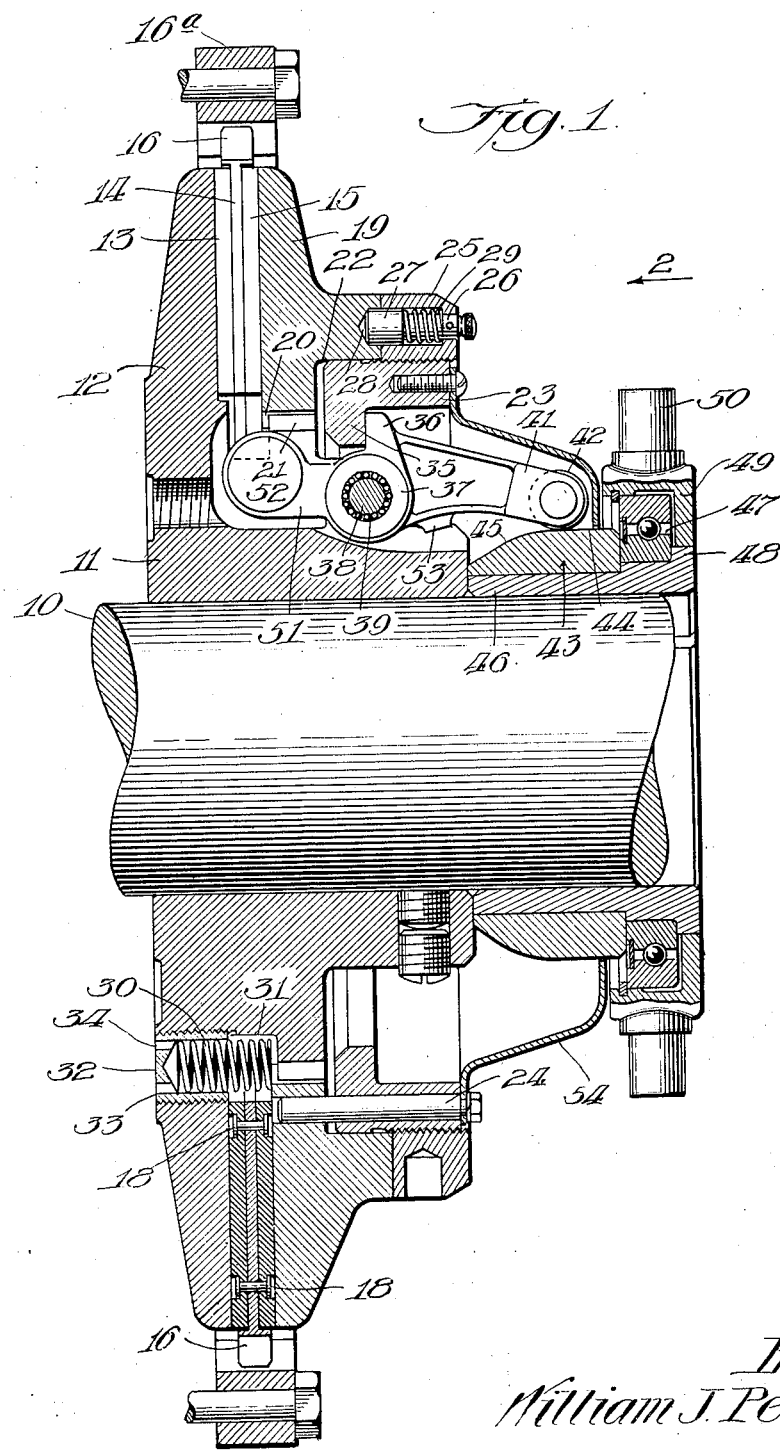
Figure 1 is a sectional elevation of the clutch, taken along the line 1—1 in Fig. 2, looking in the direction of the arrows.
Figure 2:
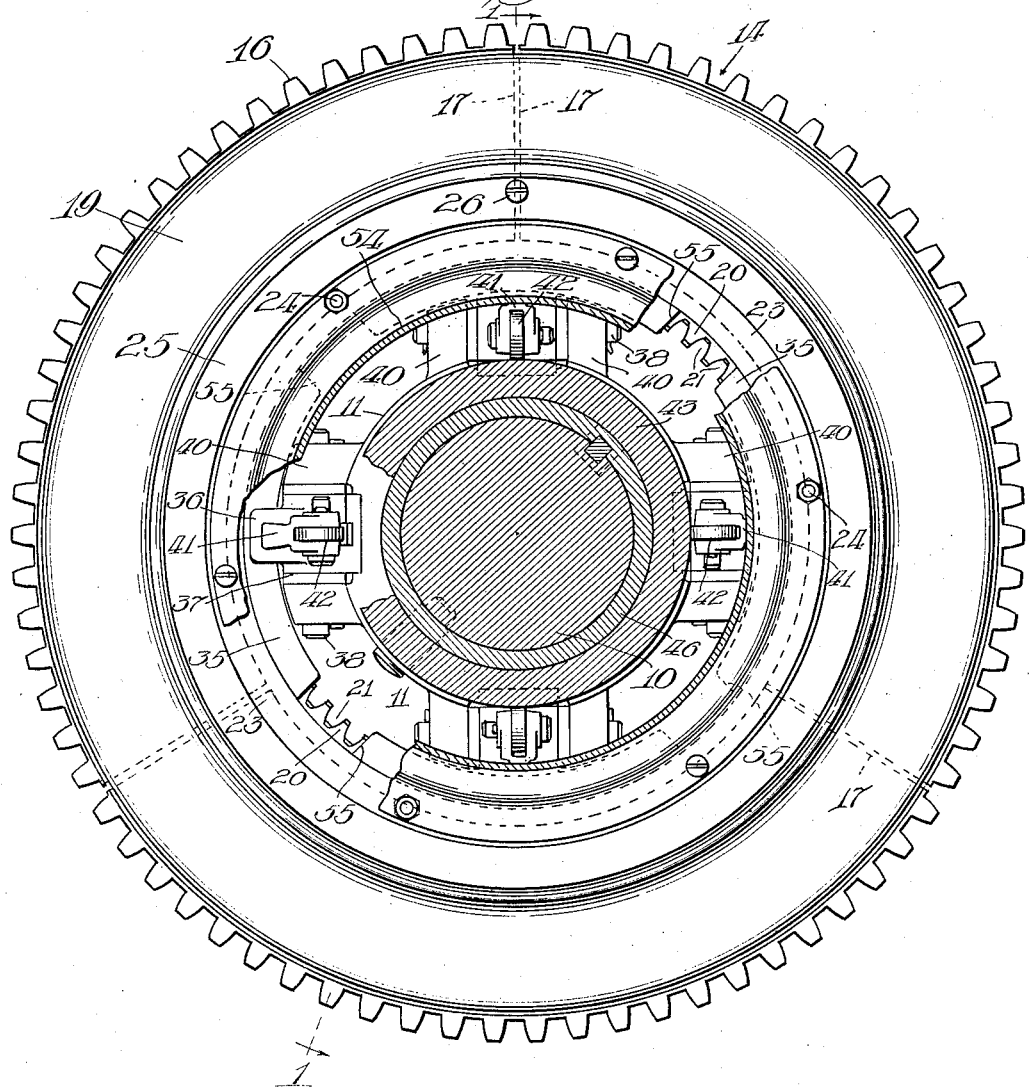
Fig. 2 is an end view of the clutch as viewed in the direction of the arrow 2 in Fig. 1.

Referring more particularly to Fig. 1, the numeral 10 designates a shaft constituting one of the rotary parts which are interconnected by the clutch and which, for purpose of illustration, will be regarded as being driven, although the conditions of operation may be reversed as to this particular. Keyed or otherwise secured for rotation with the shaft 10 is a hub 11 having preferably formed integrally therewith an annular flange that functions as a clamping plate 12 and which engages with a frictional facing 13 secured to one side of a driving plate 14 whose opposite side is likewise provided with a similar friction facing 15. The periphery of the plate 14 is provided with a plurality of teeth 16, or generally splined, for driving engagement with a driving ring 16ª which may be bolted or otherwise secured to a flywheel or other rotary part.

The driving plate 14 possesses an annular shape and is preferably cut into a number of segments 17, the friction facings 13 and 15 being secured to these segments by rivets 18 and being likewise split so that each driving plate segment is provided with a pair of facings that are substantially coextensive therewith and unconnected to the other facings on the remaining segments. One purpose of splitting the driving plate is to render the same more accessible and thus facilitate replacement of the friction facings from time to time. As far as replacement only is concerned, the driving plate could be split into two segments, but preferably the number of segments is not less than three, in order to eliminate any possibility of the segments rattling when the clutch is running free. The theory of this construction is more particularly discussed in the United States Letters Patent to Rosner, No. 1,518,604, dated December 9, 1924, but briefly, the freedom from rattle is due to the capacity of the segments to move outwardly under the impulse of centrifugal force and so wedge the teeth on the driving plate 14 into the teeth on the driving member.

A second clamping plate 19 is positioned to engage with the friction facing 15 and this plate possesses generally an annular shape and is provided with internal teeth 20 that mesh with similar teeth 21 disposed externally around the hub 11. Accordingly, the plate 19 is capacitated to move axially relative to the hub 11 and the clamping plate 12, while partaking of the rotary motion of these elements.

The plate 19 is counterbored as at 22 and an adjusting ring 23 fits closely in this bore and is rotatably secured to the plate 19 by a series of circumferentially spaced pins 24. A portion of the ring 23 projects beyond the exposed side of the plate 19 to threadingly receive in encircling relation thereto an adjusting nut 25 whose inner face abuts against the plate 19. Since the ring 23 is held against rotation relative to the plate 19 and is also held against movement toward the right as viewed in Fig. 1, by the clutch levers as hereinafter described, it will be obvious that the rotation of the nut 25 will effect an endwise movement of the plate 19. Accordingly, this nut provides a means for adjusting the plate 19 from time to time to compensate for the wear on the friction facings 13 and 15. The adjusted position of the nut 25 is maintained by means of an index pin 26 that is reciprocably mounted through an appropriate hole that extends through the thickness of the nut and the inner end 27 of this pin is enlarged for reception in any one of a plurality of depressions or sockets 28 that are circumferentially spaced around the face of the clamping plate 19. A coil spring 29 encircles the stem of the pin 26, one end of the spring abutting against the enlarged end 27 and the other against an appropriate shoulder provided in the hole in the nut through which the pin extends.

In order to assist in the separation of the clamping and driving plates from each other when the clutch is released, as hereinafter described, a plurality of coil springs 30 are mounted in appropriate pockets 31 provided in the hub 11, the inner end of each spring abutting against the plate 19 and the opposite end against the closed end 32 of a sleeve 33 that is threaded in the pocket 31 and which closed end may be provided with apertures 34 for suitable engagement with a wrench in order to establish the desired compression of the spring 30.

The adjusting ring 23 is provided with an internal flange 35 that is engaged by an arm 36 provided on a clutch lever 37 that is pivotally mounted on a pin 38 through the medium of a plurality of needle bearings 39, the ends of the pin 38 being extended for journal support in a pair of spaced lugs 40 provided on the hub 11. As many of the clutch levers 37 may be employed as desired and they are preferably equi-spaced circumferentially around the hub 11.

A second lever arm 41 is provided on each clutch lever and it extends toward the right, as viewed in Fig. 1, from the pivot pin 38 in a direction generally parallel to the axis of the shaft 10 and at its extremity there is pivotally supported therein a roller 42 which rides on the lateral surface of a collar 43 having the cylindrical and conical surface portions 44 and 45, respectively. The collar 43 is mounted on a sleeve 46 that is keyed or otherwise splinedly connected to the shaft 10 in order to partake of the rotary motion thereof, while permitting the endwise shifting of the sleeve 46 along the shaft. Preferably, this sleeve is composed of bronze in order to prevent any rusting thereof to the shaft. The collar 43 possesses a tight fit on the sleeve 46, or is otherwise securely attached thereto so as to rotarily move with the sleeve, and the inner race of a ball bearing 47 encircles the sleeve between a shoulder 48 formed on the sleeve and the adjacent end of the collar 43. The outer race of this bearing is received within a collar 49 provided with the usual trunnions 50 for engaging with a shifting fork (not shown).

Extending in the opposite direction from each lever arm 41 in a direction generally parallel to the axis of the shaft 10 and forming a part of each clutch lever is a third arm 51 which is weighted as at 52 so as to overbalance the arm 41, so that, when free to do so, this counterbalanced arm of each clutch lever will effect a clockwise rotation thereof under the impulse of centrifugal force.

The operation of the clutch is more or less obvious from the foregoing description. In Fig. 1, the clutch is shown in driving position and when the sleeve 46 is moved toward the right, the roller 42 of each clutch lever will ride down the conical lateral surface 45 of the collar 43 due to centrifugal force operating on the counterbalanced arms 51, this freedom of movement of the clutch levers being facilitated by the needle bearing mounting of each lever. This releasing movement of the clutch levers withdraws the short arms 36 from contact with the flange 35 on the adjusting ring 23, so that the clamping and driving plates are then free to release themselves and this action is assisted by the extending movement of the releasing springs 30.

The releasing movement of the clutch levers is limited by a boss 53 provided on the under or inner side of each arm 41 which contacts with the adjacent surface of the clutch hub, and the height of these bosses is such that the periphery of the rollers 42 will always occupy such a position in the released position of the clutch that they can readily ride outwardly along the conical surface 45 when the clutch is reengaged by a shifting of the sleeve 46 to the position indicated in Fig. 1.

As the friction facings 13 and 15 wear, proper adjustment is effected by rotating the adjusting nut 25 which shifts the clamping plate 19 to a new position, but does not change the relative position of the adjusting ring flange 35 and the arms 36. During this adjustment, the flange 35 bears against the arms 36. Accordingly, the throw of the clutch levers remains constant throughout the permissible wear of these facings and, hence, the maximum gripping engagement of the clamping plate with these facings is always obtained.

As clearly illustrated in Fig. 1, the major portion of each clutch lever is substantially housed within the principal elements of the clutch, thus improving the safety factor of the mechanism and the relatively short portion of each clutch lever arm 41 that projects beyond the hub 11 is suitably enclosed by a cover plate 54 that is attached to the adjusting ring 23 and which is bent into closing relation to the roller end of these arms and close to the collar 43.

When it becomes necessary to replace the friction facings, this step can be readily accomplished by removing the cover plate 54 and the pins 24. Thereupon, the adjusting ring is rotated to place the gaps 55 in the flange 35 in registration with the lever arms 36, whereupon the adjusting ring 23, adjusting nut 25 and clamping plate 19 can be moved endwise as a unit to permit the withdrawal of the driving plate segments. A simpler and quicker method of removing the segments consists in unbolting and withdrawing the driving ring 16ª and then releasing the clutch, whereupon the segments can be easily lifted out of position.

The counterbalancing of the clutch levers avoids any tendency of centrifugal force to otherwise move these parts to an engaged position which would cause drag and friction and it also eliminates any possibility of the clutch becoming partially engaged which might result in accident or injury to the operator. Further, by shaping and arranging each clutch lever so that it is substantially parallel to the axis of the shaft 10, except for the relatively short, radially extending arms 36, it is possible to design the clutch for use with relatively large diameter shafts without unduly increasing the outside diameter of the clutch. For example, in a clutch having an outside diameter of about nineteen inches, the hub can be made to accommodate a shaft of about four and one-half inches diameter. Manufacturing costs of the clutch are reduced by incorporating the clamping plate 12 integrally with the hub 11, as well as the lugs which pivotally support the clutch levers, and also by utilizing an externally coned collar as a means of operating the clutch levers, as contrasted with the relatively expensive, large diameter internal cones which are frequently employed for this type of clutch. The method of adjustment for wear is simple in construction and operation and it moreover provides for maintaining a constant throw of the clutch levers.

I claim:

1. In a clutch, the combination of a driving plate and a hub adapted for connection to separate rotary parts, a pair of clamping members located on opposite sides of the plate and adapted to grippingly engage therewith, one of the members forming part of the hub and the other member having a spline connection with the hub and movable axially relative thereto, an adjusting ring carried by the axially movable member, a nut threaded on the ring in abutting relation to the axially movable member, a plurality of levers pivoted on the hub each having one arm for engaging the adjusting ring to exert pressure against the axially movable member, and means for operating the other lever arms to engage the clutch, each of the levers being counterbalanced for movement in a releasing direction under the impulse of centrifugal force when freed from the operating means.

2. In a clutch, the combination of a driving plate and a hub adapted for connection to separate rotary parts, a pair of clamping members located on opposite sides of the plate and adapted to grippingly engage therewith, one of the members forming part of the hub and the other member having a tooth connection with the hub and movable axially relative thereto, an adjusting ring carried by the axially movable member and having a flange extending toward the axis of the hub, a nut threaded on the ring in abutting relation to the axially movable member, a plurality of levers pivoted directly on the hub each having a relatively short arm extending radially of the clutch for engaging the adjusting ring flange to exert pressure against the axially movable member and an arm substantially parallel to the clutch axis, and means for actuating the last named lever arms to engage the clutch.

3. In a clutch, the combination of a driving plate and a hub adapted for connection to separate rotary parts, a pair of clamping members located on opposite sides of the plate and adapted to grippingly engage therewith, one of the members forming part of the hub and the other member having a spline connection with the hub and movable axially relative thereto, an adjusting ring carried by the axially movable member, a nut threaded on the ring in abutting relation to the axially movable member, a plurality of levers pivoted on the hub each having a pair of arms extending in opposite directions from the lever pivot and substantially parallel to the hub axis and a relatively short arm extending radially of the clutch for engaging the adjusting ring to exert pressure against the axially movable member, one of the first named arms being counterbalanced to move the lever in a releasing direction under the impulse of centrifugal force, and means for actuating the other first named arms to engage the clutch.

4. In a clutch, the combination of a driving plate and a hub adapted for connection to separate rotary parts, a pair of clamping members located on opposite sides of the plate and adapted to grippingly engage therewith, one of the members forming part of the hub and the other member having a spline connection with the hub and movable axially relative thereto, an adjusting ring carried by the axially movable member, a nut threaded on the ring in abutting relation to the axially movable member, a plurality of levers pivoted on the hub, each having a pair of arms extending in opposite directions from the lever pivot substantially parallel to the hub axis and a relatively short arm extending radially of the clutch for engaging the adjusting ring to exert pressure against the axially movable member, one of the first named arms being counterbalanced to move the lever in a releasing direction under the impulse of centrifugal force and the other arm projecting beyond the adjacent end of the hub, and means for actuating the last-named lever arms to engage the clutch, the short and counterbalanced arms and a part of the other arms being housed between the hub and the portions of the clutch outwardly thereof.

WILLIAM J. PEARMAIN.